US008970458B2

(12) United States Patent
Komiya et al.

(10) Patent No.: US 8,970,458 B2
(45) Date of Patent: Mar. 3, 2015

(54) ORGANIC LIGHT EMITTING DISPLAY AND METHOD OF DRIVING THE SAME

(75) Inventors: Naoaki Komiya, Yongin (KR); Jang-Doo Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 830 days.

(21) Appl. No.: 13/019,151

(22) Filed: Feb. 1, 2011

(65) Prior Publication Data

US 2012/0026207 A1 Feb. 2, 2012

(30) Foreign Application Priority Data

Jul. 27, 2010 (KR) ........................ 10-2010-0072429

(51) Int. Cl.

| | |
|---|---|
| ***G09G 3/30*** | (2006.01) |
| ***G06F 3/038*** | (2013.01) |
| ***G09G 5/00*** | (2006.01) |
| ***G09G 3/32*** | (2006.01) |

(52) U.S. Cl.

CPC ...... *G09G 3/3233* (2013.01); *G09G 2300/0852* (2013.01); *G09G 2300/0861* (2013.01); *G09G 2310/0218* (2013.01); *G09G 2300/0819* (2013.01)

USPC ................................ 345/77; 345/76; 345/213

(58) Field of Classification Search

USPC ...................................................... 345/76–83

See application file for complete search history.

(56) References Cited

U.S. PATENT DOCUMENTS

2005/0269958 A1* 12/2005 Choi et al. ................. 315/169.3
2005/0285827 A1* 12/2005 Eom .............................. 345/76
2009/0195530 A1* 8/2009 Ozaki ........................... 345/213

FOREIGN PATENT DOCUMENTS

KR 10-2005-0109166 11/2005
KR 10-2006-0073681 6/2006
KR 10-2006-0104841 10/2006

* cited by examiner

*Primary Examiner* — Kenneth Bukowski

(74) *Attorney, Agent, or Firm* — Christie, Parker & Hale, LLP

(57) ABSTRACT

There is provided an organic light emitting display capable of minimizing noise. A method of driving the organic light emitting display includes setting pixels included in horizontal blocks into a non-emission state, the pixels charging voltages corresponding data signals, the pixels starting to emit light at different times in units of the horizontal blocks, and emitting light from the pixels according to the charging voltages.

16 Claims, 5 Drawing Sheets

ORGANIC LIGHT EMITTING DISPLAY AND METHOD OF DRIVING THE SAME

CROSS-REFERENCE TO RELATED APPLICATION

This application claims priority to and the benefit of Korean Patent Application No. 10-2010-0072429, filed on Jul. 27, 2010, in the Korean Intellectual Property Office, the entire content of which is incorporated herein by reference.

BACKGROUND

1. Field of the Invention

Aspects of embodiments according to the present invention relate to an organic light emitting display and a method of driving the same.

2. Description of the Related Art

A variety of flat panel displays (FPDs) which are lighter and smaller than cathode ray tubes (CRTs), have been recently developed. The FPDs include liquid crystal displays (LCDs), field emission displays (FEDs), plasma display panels (PDPs), and organic light emitting displays.

Organic light emitting displays use organic light emitting diodes (OLEDs) to generate light by a recombination of electrons and holes. Organic light emitting displays have a high response speed and are driven with low power consumption. In general, an organic light emitting display is classified as a passive matrix type OLED (PMOLED) display or an active matrix type OLED (AMOLED) display according to the method of driving the OLEDs.

AMOLEDs include a plurality of scan lines, a plurality of data lines, a plurality of power source lines, and a plurality of pixels coupled to the above lines to be arranged in the form of a matrix. In addition, each of the pixels typically includes an OLED, a driving transistor for controlling the amount of current supplied to the OLED, a switching transistor for transmitting a data signal to the driving transistor, and a storage capacitor for storing the voltage of the data signal.

Two methods of driving an organic light emitting display are a progressive emission method and a concurrent (e.g., simultaneous) emission method. In the progressive emission method, data are sequentially input to the scan lines, and the pixels are sequentially emitted in units of horizontal lines in the same order as the input data.

In the concurrent emission method, after data are sequentially input to the scan lines and the data are input to all of the pixels, the pixels are concurrently (e.g., simultaneously) emitted. The concurrent emission method has advantages in that the threshold voltage of the driving transistor is compensated for, the structure of a pixel may be maintained in a simple manner, and a 3D display may be easily realized. However, in the concurrent emission method, emission noise increases because all of the pixels included in a panel are concurrently emitted.

In the concurrent emission method, the current that flows to the panel changes from 0A to a predetermined current (e.g., iA, wherein i is a natural number) within a short amount of time. When the current of the predetermined iA flows to the panel within the short amount of time, a large amount of noise (or electronic wave) is emitted from power source lines ELVDD and ELVSS, which may affect an image displayed on the panel or affect a peripheral apparatus.

SUMMARY

Accordingly, embodiments of the present invention provide an organic light emitting display for reducing or minimizing emitted noise in a concurrent emission method and a method of driving the same.

According to an embodiment of the present invention, a method of driving an organic light emitting display in which a panel is divided into at least 2 horizontal blocks comprised of pixels, the method including: setting the pixels at a non-emission state; changing the pixels with voltages corresponding to data signals; and varying an emission start time of the pixels according to the respective horizontal blocks; and emitting light from the pixels using the charged voltages, wherein the pixels start emitting light at different times according to the respective horizontal blocks.

According to an embodiment, after the pixels in a first horizontal block of the horizontal blocks emit light, pixels in a second horizontal block of the horizontal blocks emit light. And after the pixels comprising the first horizontal block stop emitting light, the pixels in the second horizontal block stop emitting emit light.

According to another embodiment of the present invention, a method of driving an organic light emitting display, in which a panel is divided into at least 2 horizontal blocks, the horizontal blocks including a plurality of emission control lines and pixels, the pixels including control transistors that are configured to turn off when emission signals are supplied to the emission control lines to control emission times of the pixels and to turn on at other times, the method including: supplying emission control signals to the emission control lines; sequentially supplying scan signals to scan lines and selecting pixels in units of horizontal lines; supplying data signals to the pixels selected by the scan signals; and stopping the supply of the emission control signals in units of the horizontal blocks at different points in time.

Stopping the supply of the emission control signals in units of the horizontal blocks at different points in time may include turning on the control transistors at different points in time.

The duration of each of the emission control signals supplied to the emission control lines may be substantially the same.

The pixels may further include driving transistors, and before sequentially supplying the scan signals to the scan lines and selecting the pixels in units of horizontal lines, a period of compensating for threshold voltages of the driving transistors occurs.

According to another embodiment of the present invention, an organic light emitting display includes: a scan driver for supplying scan signals to scan lines and for supplying emission control signals to emission control lines; a data driver for supplying data signals to data lines in synchronization with the scan signals; and a panel including emission control lines and at least 2 horizontal blocks including pixels for charging voltages according to the data signals when the scan signals are supplied, and for controlling an amount of current supplied to an organic light emitting diode (OLED) when the emission control signals are not supplied, wherein a panel is divided into at least 2 horizontal blocks, and wherein the scan driver is configured to supply the emission control signals at different times to each of the horizontal blocks.

The scan driver may be configured to supply emission control signals to the emission control lines in a period where all of the pixels are charged with voltages according to the data signals.

The scan driver is configured to stop supplying the emission control signals at different times to different ones of the horizontal blocks, after the voltages corresponding to the data signals are charged in all of the pixels.

The scan driver may be configured to supply emission control signals having a same duration to each of the emission control lines.

Each of the pixels may include: an OLED; a pixel circuit for controlling an amount of current supplied to the OLED; and an emission control transistor coupled between the OLED and the pixel circuit, the emission control transistor being configured to turn off during a period when the emission control signals are supplied and to turn on in all other periods.

The organic light emitting display may also include: a control line commonly coupled to the pixels; and a control line driver for supplying a control signal to the control line.

The pixel circuit may includes: a driving transistor for controlling an amount of current supplied to the OLED; a first capacitor including a first terminal coupled at a second node to a gate electrode of the driving transistor; a first transistor coupled between a second terminal of the first capacitor at a first node and a data line, and turned on when a corresponding one of the scan signals is supplied to a corresponding scan line of the scan lines; a third transistor coupled between the second node and a second electrode of the driving transistor, and being configured to turn on when a control signal is supplied to the control line; a fourth transistor coupled between the first node and a reference power source, and being configured to turn on when the control signal is supplied to the control line; a second capacitor coupled between the first node and a first power source.

The control line driver may be configured to supply the control signal to the control line before the scan signals are supplied to the scan lines.

The reference power source may be set to a voltage level equal to or higher than a voltage level of the data signal.

According to the organic light emitting display and the method of driving the same, the panel is divided into a plurality of horizontal blocks and the emission points of time of the pixels are set to be different from each other in units of horizontal blocks so that noise may be minimized.

BRIEF DESCRIPTION OF THE DRAWINGS

The above and other aspects and features of the embodiments according to the present invention will be more clearly understood from the following detailed description taken in conjunction with the accompanying drawings, in which.

DETAILED DESCRIPTION

Figure 1:
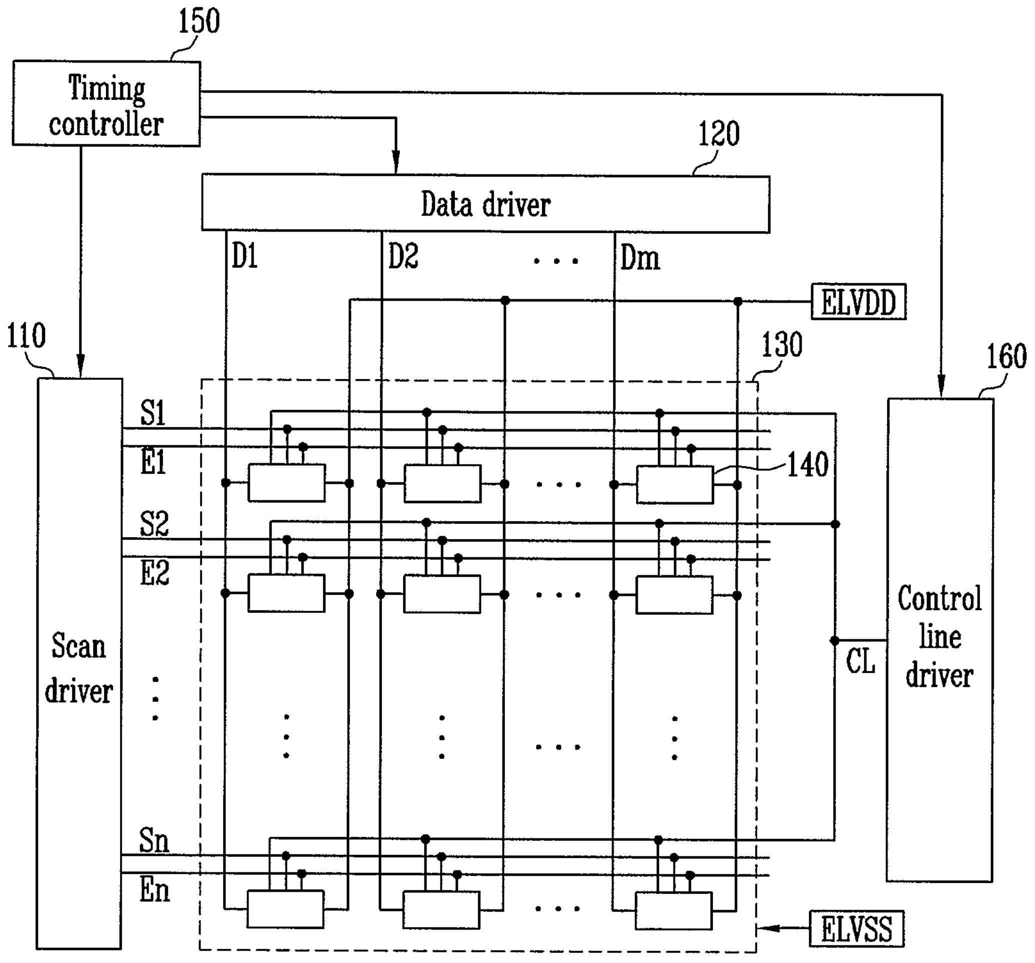
FIG. 1 is a block diagram illustrating an organic light emitting display according to an embodiment of the present invention.

Hereinafter, certain exemplary embodiments of the present invention will be described with reference to the accompanying drawings. Herein, when a first element is described as being coupled to a second element, the first element may be directly coupled to the second element or may be indirectly coupled to the second element via a third element. Further, some of the elements that are not essential to a complete understanding of the invention are omitted for brevity. Also, like reference numerals refer to like elements throughout.

Hereinafter, exemplary embodiments of the present invention will be described in detail with reference to FIGS. 1 to 6D.

FIG. 1 is a block diagram illustrating an organic light emitting display according to an embodiment of the present invention.

Referring to FIG. 1, the organic light emitting display according to an embodiment of the present invention includes a display unit 130 including pixels 140 positioned at the crossing regions of scan lines S1 to Sn, emission control lines E1 to En, a control line CL, and data lines D1 to Dm, a scan driver 110 for driving the scan lines S1 to Sn and the emission control lines E1 to En, a control line driver 160 for driving the control line CL, a data driver 120 for driving the data lines D1 to Dm, and a timing controller 150 for controlling the scan driver 110, the control line driver 160, and the data driver 120.

The control line driver 160 supplies a control signal to the control line CL during a threshold voltage compensating period in one frame. Here, the control line CL is commonly coupled to all of the pixels 140 so that the control signal is supplied to all of the pixels 140.

The scan driver 110 sequentially supplies scan signals to the scan lines S1 to Sn in a scan period in one frame so as to allow the pixels to emit light. In addition, the scan driver 110 supplies emission control signals to the emission control lines E1 to En during the threshold voltage compensating period and the scan period in one frame. The scan driver 110 does not supply the emission control signals to the emission control lines E1 to En in an emission period in one frame. Here, the panel is divided into j (horizontal blocks coupled to the plurality of emission control lines E. Emission control signals are supplied to different blocks (e.g., 1401-1404) at different times.

Figure 2:
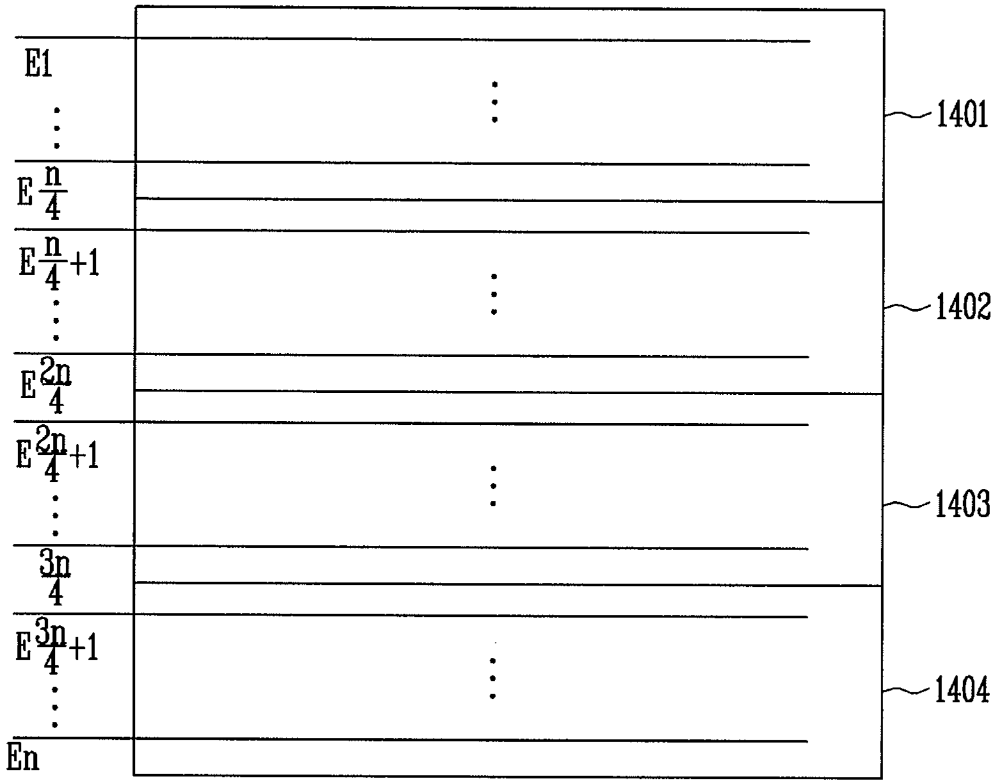
FIG. 2 is a view illustrating a panel divided into a plurality of blocks.

For example, the panel may be divided into four blocks as illustrated in FIG. 2. A first block 1401 includes a first emission control line E1 to a n/4th emission control line En/4. A second block 1402 includes a (n/4+1)th emission control line En/4+1 to a 2n/4th emission control line E2n/4. A third block 1403 includes a (2n/4+1)th emission control line E2n/4+1 to a (3n/4)th emission control line E3n/4. A fourth block 1404 includes a (3n/4+1)th emission control line E3n/4+1 to an nth emission control line En.

Here, pixels within the same block (e.g., one of 1401 to 1404) receive the emission control signals at the same point in time (e.g., simultaneously or concurrently). However, the emission control lines included in different blocks 1401 to 1404 receive the emission control signal at different times. For example, the emission control signals may be sequentially supplied in the order of the first block 1401, the second block 1402, the third block 1403, and the fourth block 1404. However, because the pulse width of the emission control signals supplied to the emission control lines E is configured to be the same duration, during the emission period the supply of the emission control signals is accordingly stopped in the order of the first block 1401, the second block 1402, the third block 1403, and the fourth block 1404.

The data driver 120 supplies data signals to the data lines D1 to Dm in synchronization with the scan signals supplied to the scan lines S1 to Sn in a scan period.

The timing controller 150 controls the scan driver 110, the data driver 120, and the control line driver 160.

The display unit 130 includes the pixels 140 positioned at the crossing regions of the scan lines S1 to Sn and the data lines D1 to Dm. The pixels 140 are coupled to a first power source ELVDD and a second power source ELVSS. The pixels 140 control the amount of current supplied from the first power source ELVDD to the second power source ELVSS via an organic light emitting diode (OLED) according to the data signals in the emission period in one frame. Then, light (e.g., light with a predetermined brightness) is generated by the OLED. Here, during the emission period, the pixels 140 start emission at different times, according to their respective blocks, as illustrated in FIG. 2.

Figure 3:
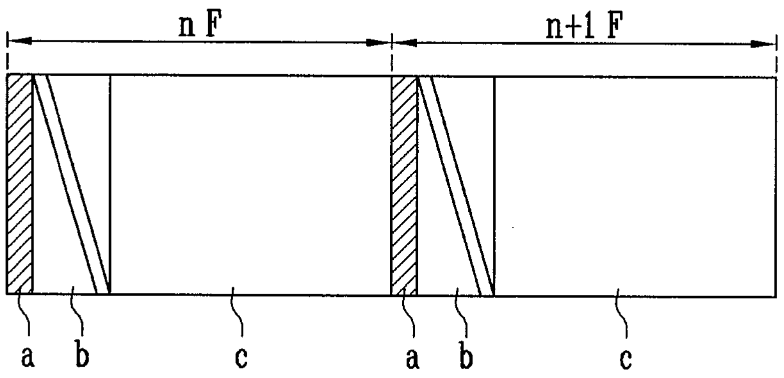
FIG. 3 is a view illustrating one frame according to an embodiment of the present invention.

FIG. 3 is a view illustrating one frame according to an embodiment of the present invention.

Referring to FIG. 3, the organic light emitting display according to an embodiment of the present invention is driven by the concurrent emission method. One frame driving by the concurrent emission method according to an embodiment of the present invention is divided into (a) a threshold voltage compensating period, (b) a scanning period, and (c) an emission period.

In (a) the threshold voltage compensating period, the voltages corresponding to the threshold voltages of the driving transistors of the pixels 140 included in the display unit 130 are charged according to the control signal supplied to the control line CL.

In (b) the scanning period, the scan signals are sequentially supplied to the scan lines S1 to Sn, and the data signals are supplied to the data lines D1 to Dm in synchronization with the scan signals. During both (a) the threshold voltage compensating period and (b) the scanning period, the pixels 140 are set to be in a non-emission state.

In (c) the emission period, the pixels 140 emit light according to the data signals. Here, the start of the emission of the pixels 140 is different from each other, based on their respective blocks. For example, the emission start time may be set in the order of the pixels 140 included in the first block 1401 to the pixels 140 included in the fourth block 1404. Setting the emission timing (in the emission period) of the pixels 140 based on their respective blocks, helps prevent high current from instantaneously flowing to the panel. Therefore, emission noise may be reduced or minimized.

On the other hand, in FIG. 3, for convenience sake, it is illustrated that one frame is divided into (a) the threshold voltage compensating period, (b) the scanning period, and (c) the emission period. However, embodiments of the present invention is not limited to the above, and the above embodiments may be applied to all of the organic light emitting display driven by the concurrent emission method.

Figure 4:
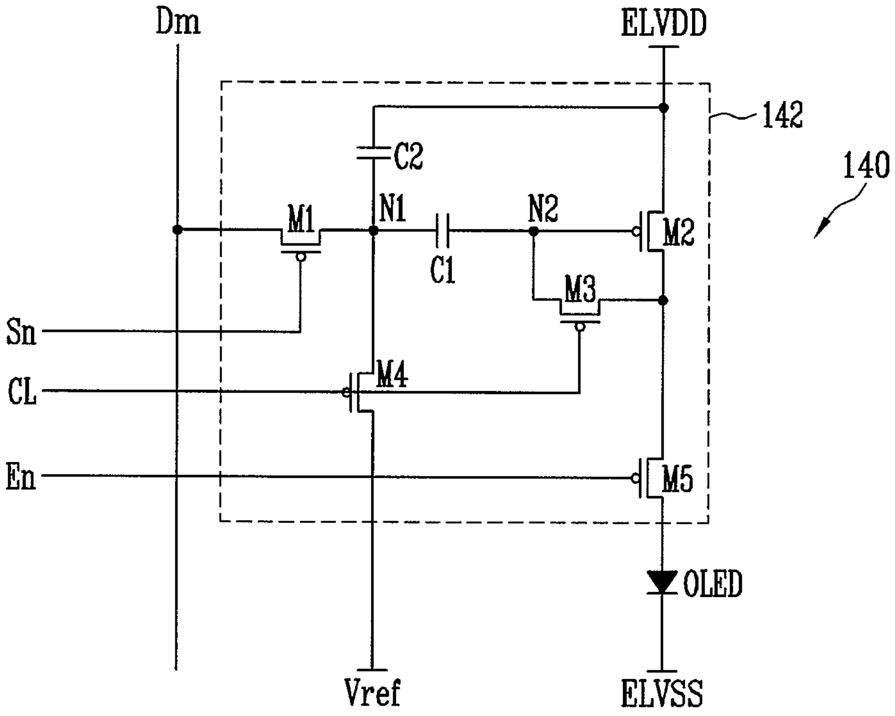
FIG. 4 is a view illustrating an embodiment of the pixel shown in FIG. 1.

FIG. 4 is a view illustrating an embodiment of the pixel of FIG. 1.

Referring to FIG. 4, the pixel according to an embodiment of the present invention includes an OLED and a pixel circuit 142 for controlling the amount of current supplied to the OLED.

The anode electrode of the OLED is coupled to the pixel circuit 142 and the cathode electrode of the OLED is coupled to the second power source ELVSS. The OLED generates light (e.g., light with predetermined brightness) according to the current supplied from the pixel circuit 142.

The pixel circuit 142 charges the voltage in accordance with the data signal and the threshold voltage of the driving transistor and controls the amount of current supplied to the OLED to correspond to the charged voltage. According to an embodiment of the present invention, the pixel circuit 142 may include one of various circuits in which the emission time is controlled by the emission control signal supplied by the emission control line En. For example, the pixel circuit 142 may include five transistors M1 to M5 and two capacitors C1 and C2.

According to an embodiment of the present invention, the first electrode of the first transistor M1 is coupled to the data line Dm and the second electrode of the first transistor M1 is coupled to a first node N1. The gate electrode of the first transistor M1 is coupled to the scan line Sn. The first transistor M1 is turned on when a scan signal is supplied to the scan line Sn to electrically couple the data line Dm to the first node N1.

The first electrode of the second transistor M2 (the driving transistor) is coupled to the first power source ELVDD and the second electrode of the second transistor M2 is coupled to the first electrode of the fifth transistor M5. The gate electrode of the second transistor M2 is coupled to a second node N2. The second transistor M2 controls the amount of current supplied from the first power source ELVDD to the second power source ELVSS via the OLED according to the voltage applied to the second node N2.

The first electrode of the third transistor M3 is coupled to the second electrode of the second transistor M2 and the second electrode of the third transistor M3 is coupled to the second node N2. The gate electrode of the third transistor M3 is coupled to the control line CL. The third transistor M3 is turned on when the control signal is supplied to the control line CL to diode-couple the second transistor M2.

The first electrode of the fourth transistor M4 is coupled to a reference power source Vref and the second electrode of the fourth transistor M4 is coupled to the first node N1. The gate electrode of the fourth transistor M4 is coupled to the control line CL. The fourth transistor M4 is turned on when the control signal is supplied to the control line CL to supply the voltage of the reference power source Vref to the first node N1. Here, the voltage of the reference power source Vref is set to be equal to or higher than the data signal.

The first electrode of the fifth transistor M5 is coupled to the second electrode of the second transistor M2 and the second electrode of the fifth transistor M5 is coupled to the anode electrode of the OLED. The gate electrode of the fifth transistor M5 is coupled to the emission control line En. The fifth transistor M5 is turned off when the emission control signal is supplied to the emission control line En and is turned on when the emission control signal is not supplied.

The first capacitor C1 is coupled between the first node N1 and the second node N2. The first capacitor c1 charges the voltage according to the threshold voltage of the second transistor M2.

The second capacitor C2 is coupled between the first node N1 and the first power source ELVDD. The second capacitor C2 charges the voltage according to the data signal.

Figure 5:
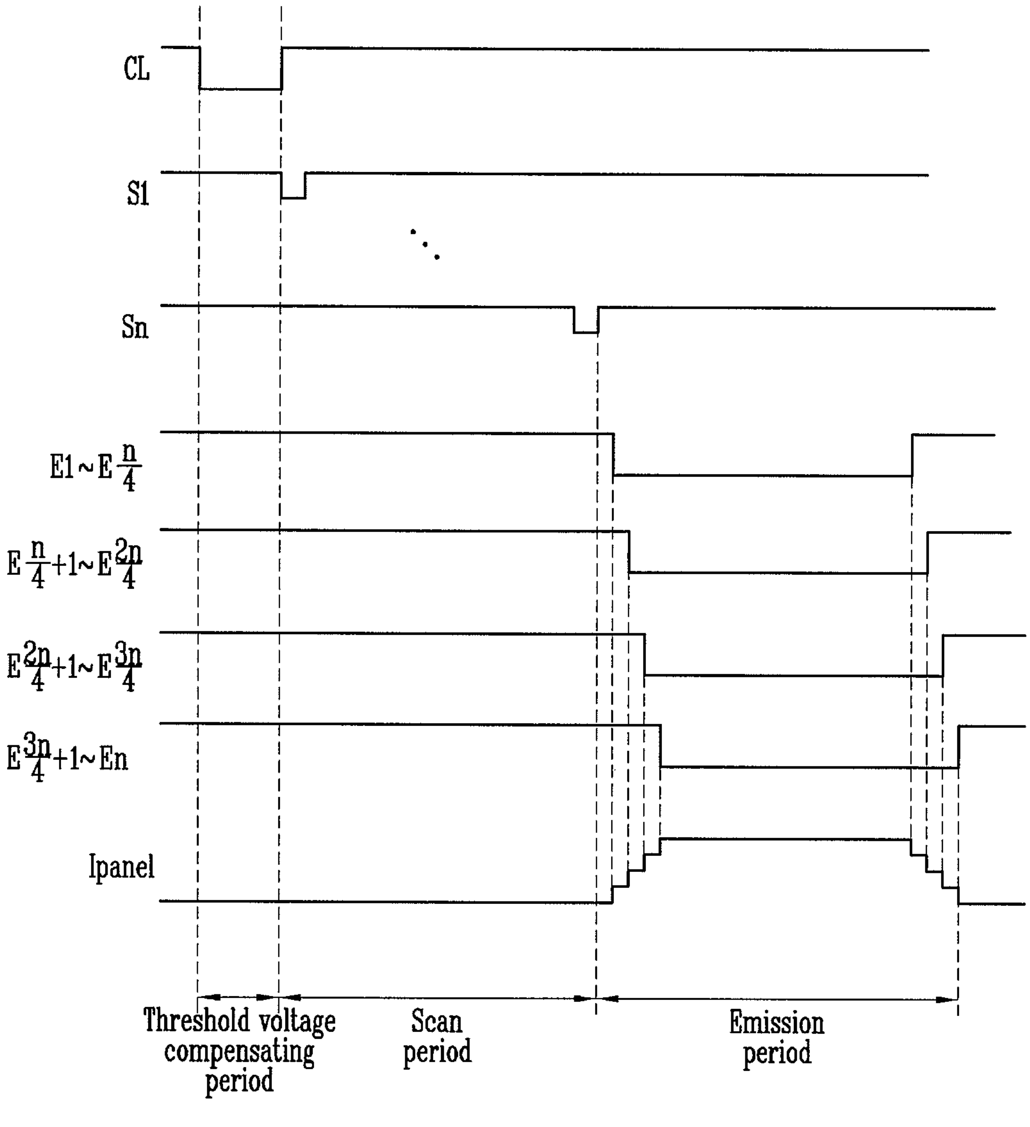
FIG. 5 is a waveform chart illustrating a method of driving the pixel shown in FIG. 4.

FIG. 5 is a waveform chart illustrating a method of driving the pixel shown in FIG. 4. In FIG. 5, for convenience sake, as illustrated in FIG. 2, it is assumed that a panel is divided into four blocks.

Referring to FIG. 5, first, in the threshold voltage compensating period, the control signal is supplied to the control line CL. When the control signal is supplied to the control line CL, the third transistor M3 and the fourth transistor M4 are turned on. When the fourth transistor M4 is turned on, the voltage of the reference power source Vref is supplied to the first node N1. When the third transistor M3 is turned on, the second node N2 and the second electrode of the second transistor M2 are electrically coupled to each other. At this time, the second transistor M2 is diode-coupled, such that the voltage obtained by subtracting the threshold voltage of the second transistor M2 from the voltage level of the first power source ELVDD is applied to the second node N2.

In the threshold voltage compensating period, the first capacitor c1 charges to a voltage level corresponding to the difference in voltage levels between the first node N1 and the second node N2. Here, since the reference power source Vref and the first power source ELVDD are set to be the same in the pixels 140, the voltage corresponding to the threshold voltage of the second transistor M2 is charged in the first capacitor C1.

In the scan period, the scan signals are sequentially supplied to the scan lines S1 to Sn, and the data signals are supplied to the data lines D1 to Dm in synchronization with the scan signals. When the scan signal is supplied to the scan line Sn, the first transistor M1 is turned on. When the first transistor M1 is turned on, the data line Dm and the first node N1 are electrically coupled to each other so that the data signal from the data line Dm is supplied to the first node N1.

When the data signal is supplied to the first node N1, the voltage of the first node N1 is reduced from the voltage of the reference power source Vref to the voltage of the data signal. At this time, the voltage of the second node N2 set in a floating state is reduced to correspond to the amount of voltage drop of the first node N1. The second capacitor C2 charges to a voltage level (e.g., a predetermined voltage level) corresponding to the data signal applied to the first node N1. On the other hand, since the reference power source Vref is set to have a uniform voltage, the amount of voltage drop of the second node N2 is determined by the data signal. Therefore, the second transistor M2 controls the amount of current that flows to the OLED according to the data signal.

On the other hand, in the threshold voltage compensating period and the scan period, the emission control signals are supplied to the emission control lines E1 to En so that the fifth transistor M5, included in each of the pixels 140, is turned off. In this case, current is not supplied to the OLED and the pixels 140 are set to be in a non-emission state.

Figure 6A:
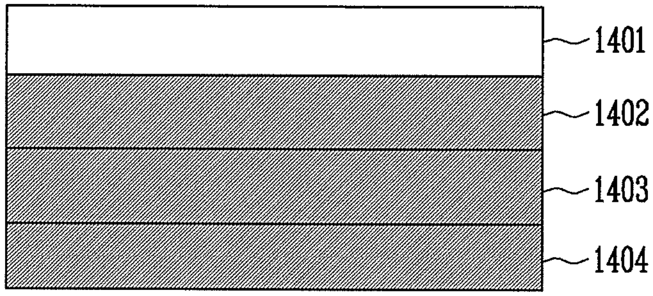
FIGS. 6A and 6D are views illustrating the emission orders of blocks, respectively, according to the driving waveform shown in 5.

In the emission period, supply of the emission control signals is stopped in units of blocks 1401 to 1404. That is, the supply of the emission control signals to the emission control lines E1 to En/4 included in the first block 1401 is stopped at the initial stage of the emission period. When the supply of the emission control signals to the emission control lines E1 to En/4 included in the first block 1401 is stopped, the fifth transistor M5 included in each of the pixels 140 coupled to the emission control lines E1 to En/4 is turned on. Then, as illustrated in FIG. 6A, the pixels 140 included in the first block 1401 emit light corresponding to the data signals.

Figure 6B:
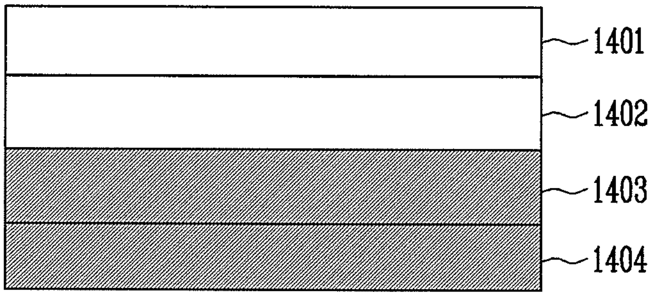

After the pixels 140 of the first block 1401 emit light, the supply of the emission control signals to the emission control lines En/4+1 to E2n/4 included in the second block 1402 is stopped. When the supply of the emission control signals to the emission control lines En/4+1 to E2n/4 included in the second block 1402 is stopped, the fifth transistor M5 included in each of the pixels 140 coupled to the emission control lines En/4+1 to E2n/4 is turned on. Then, as illustrated in FIG. 6B, the pixels 140 included in the second block 1402 emit light corresponding to the data signals.

Figure 6C:
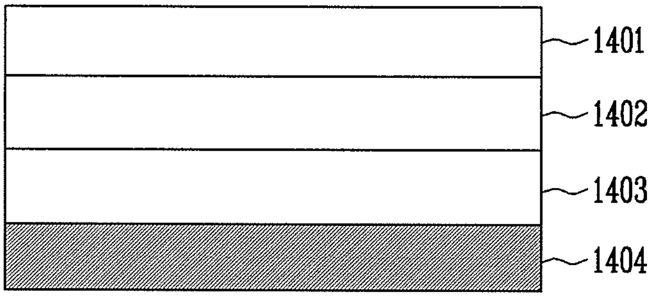

After the pixels 140 of the second block 1402 emit light, the supply of the emission control signals to the emission control lines E2n/4+1 to E3n/4 included in the third block 1403 is stopped. When the supply of the emission control signals to the emission control lines E2n/4+1 to E3n/4 included in the third block 1403 is stopped, the fifth transistor M5 included in each of the pixels 140 coupled to the emission control lines E2n/4+1 to E3n/4 is turned on. Then, as illustrated in FIG. 6C, the pixels 140 included in the third block 1403 emit light corresponding to the data signals.

Figure 6D:
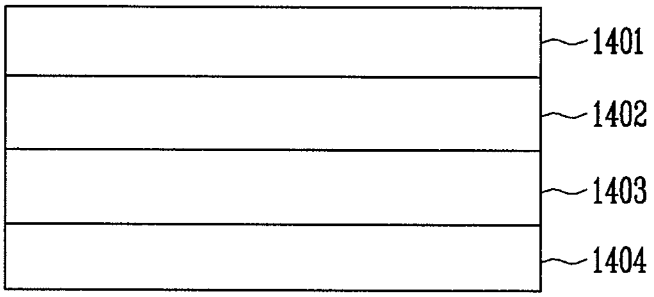

After the pixels 140 of the third block 1403 emit light, the supply of the emission control signals to the emission control lines E3n/4+1 to En included in the fourth block 1404 is stopped. When the supply of the emission control signals to the emission control lines E3n/4+1 to En included in the fourth block 1404 is stopped, the fifth transistor M5 included in each of the pixels 140 coupled to the emission control lines E3n/4+1 to En is turned on. Then, as illustrated in FIG. 6D, the pixels 140 included in the fourth block 1404 emit light corresponding to the data signals.

In this case, the current Ipanel that flows to the panel increases in the form of a step-wave for a duration (e.g., a predetermined time). As described above, when the current Ipanel increases in the form of the step-wave for duration, the noise emitted at the emission points in time of the pixels may be minimized.

On the other hand, since the emission control signals supplied to the emission control lines E1 to En have the same width, the pixels 140 do not emit light in the order of the first block 1401, the second block 1402, the third block 1403, and the fourth block 1404. At this time, the current Ipanel that flows to the panel is reduced in the form of the step wave for the duration so that the noise emitted at the emission points in time of the pixels may be reduced or minimized.

As described above, according to embodiments of the present invention, the panel is divided into the plurality of blocks and the emission starting times for the blocks are set to be different from each other so that the emitted noise may be reduced or minimized. As described above, when the emitted noise is reduced or minimized, a stable image may be displayed on the panel. Additionally influences on peripheral apparatus may be reduced or minimized.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of driving an organic light emitting display in which a panel is divided into at least 2 horizontal blocks of pixels that are driven during one frame, the method comprising:

setting the pixels at a non-emission state;

charging the pixels with voltages corresponding to data signals;

varying an emission start time of the pixels according to the respective horizontal blocks after all of the pixels in the panel have been charged with the voltages corresponding to the data signals during the one frame; and emitting light from the pixels using the charged voltages, wherein the pixels start emitting light at different times according to the respective horizontal blocks.

2. The method as claimed in claim 1, wherein, after the pixels in a first horizontal block of the horizontal blocks emit light, pixels comprising a second horizontal block of the horizontal blocks emit light.

3. The method as claimed in claim 2, wherein, after the pixels comprising the first horizontal block stop emitting light, the pixels comprising the second horizontal block stop emitting emit light.

4. A method of driving an organic light emitting display, in which a panel is divided into at least 2 horizontal blocks that are driven during one frame, the horizontal blocks comprising a plurality of emission control lines and pixels, the pixels comprising control transistors that are configured to turn off when emission signals are supplied to the emission control lines to control emission times of the pixels and to turn on at other times, the method comprising:

supplying emission control signals to the emission control lines;

sequentially supplying scan signals to scan lines and selecting pixels in units of horizontal lines;

supplying data signals to the pixels selected by the scan signals; and stopping the supply of the emission control signals in units of the horizontal blocks at different points in time after the scan signals have been supplied to all of the scan lines in the panel during the one frame.

5. The method as claimed in claim 4, wherein, stopping the supply of the emission control signals in units of the horizontal blocks at different points in time comprises turning on the control transistors at different points in time.

6. The method as claimed in claim 4, wherein the duration of each of the emission control signals supplied to the emission control lines is substantially the same.

7. The method as claimed in claim 4, wherein, the pixels further comprise driving transistors, and before sequentially supplying the scan signals to the scan lines and selecting the pixels in units of horizontal lines, a period of compensating for threshold voltages of the driving transistors occurs.

8. An organic light emitting display comprising:

a scan driver for supplying scan signals to scan lines and for supplying emission control signals to emission control lines;

a data driver for supplying data signals to data lines in synchronization with the scan signals; and a panel comprising emission control lines and at least 2 horizontal blocks that are driven during one frame and comprising pixels for charging voltages according to the data signals when the scan signals are supplied, and after the scan signals have been supplied to all of the scan lines in the panel during the one frame, for controlling an amount of current supplied to an organic light emitting diode (OLED) when the emission control signals are not supplied, wherein the scan driver is configured to supply the emission control signals at different times to each of the at least 2 horizontal blocks.

9. The organic light emitting display as claimed in claim 8, wherein the scan driver is configured to supply emission control signals to the emission control lines in a period where all of the pixels are charged with voltages according to the data signals.

10. The organic light emitting display as claimed in claim 9, wherein the scan driver is configured to stop supplying the emission control signals at different times to different ones of the horizontal blocks, after the voltages corresponding to the data signals are charged in all of the pixels.

11. The organic light emitting display as claimed in claim 8, wherein the scan driver is configured to supply emission control signals having a same duration to each of the emission control lines.

12. The organic light emitting display as claimed in claim 8, wherein each of the pixels comprises:

an OLED;

a pixel circuit for controlling an amount of current supplied to the OLED; and an emission control transistor coupled between the OLED and the pixel circuit, the emission control transistor being configured to turn off during a period when the emission control signals are supplied and to turn on in all other periods.

13. The organic light emitting display as claimed in claim 12, further comprising:

a control line commonly coupled to the pixels; and a control line driver for supplying a control signal to the control line.

14. The organic light emitting display as claimed in claim 13, wherein the pixel circuit comprises:

a driving transistor for controlling an amount of current supplied to the OLED;

a first capacitor comprising a first terminal coupled at a second node to a gate electrode of the driving transistor;

a first transistor coupled between a second terminal of the first capacitor at a first node and a data line, and turned on when a corresponding one of the scan signals is supplied to a corresponding scan line of the scan lines;

a third transistor coupled between the second node and a second electrode of the driving transistor, and being configured to turn on when a control signal is supplied to the control line;

a fourth transistor coupled between the first node and a reference power source, and being configured to turn on when the control signal is supplied to the control line;

a second capacitor coupled between the first node and a first power source.

15. The organic light emitting display as claimed in claim 14, wherein the control line driver is configured to supply the control signal to the control line before the scan signals are supplied to the scan lines.

16. The organic light emitting display as claimed in claim 14, wherein the reference power source is set to a voltage level equal to or higher than a voltage level of the data signal.

* * * * *